US010618630B2

(12) United States Patent
Nussenblatt et al.

(10) Patent No.: US 10,618,630 B2
(45) Date of Patent: Apr. 14, 2020

(54) FLEX BEAM FOR ROTOR ASSEMBLY

(71) Applicant: SIKORSKY AIRCRAFT CORPORATION, Stratford, CT (US)

(72) Inventors: Eric Lucien Nussenblatt, Stamford, CT (US); David H. Hunter, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 449 days.

(21) Appl. No.: 15/501,133

(22) PCT Filed: Aug. 5, 2015

(86) PCT No.: PCT/US2015/043785
§ 371 (c)(1),
(2) Date: Feb. 1, 2017

(87) PCT Pub. No.: WO2016/022667
PCT Pub. Date: Feb. 11, 2016

(65) Prior Publication Data
US 2017/0217564 A1 Aug. 3, 2017

Related U.S. Application Data

(60) Provisional application No. 62/034,959, filed on Aug. 8, 2014.

(51) Int. Cl.
*B64C 11/20* (2006.01)
*B64C 27/473* (2006.01)
(Continued)

(52) U.S. Cl.
CPC .............. *B64C 11/20* (2013.01); *B64C 27/33* (2013.01); *B64C 27/46* (2013.01); *B64C 27/473* (2013.01)

(58) Field of Classification Search
CPC ......... B64C 11/20; B64C 27/33; B64C 27/46; B64C 27/473; B64C 27/48
See application file for complete search history.

(56) References Cited

U.S. PATENT DOCUMENTS 3,279,278 A * 10/1966 Eldred .................... B29C 70/20
74/579 R
3,460,628 A 8/1969 Tankersley
(Continued)

FOREIGN PATENT DOCUMENTS

EP 2570346 A1 3/2013

OTHER PUBLICATIONS

International Search Report and Written Opinion; International Application No. PCT/US2015/043785; International Filing Date: Oct. 22, 2015; dated Aug. 5, 2015; 16 Pages.
(Continued)

*Primary Examiner* — Christopher Verdier
*Assistant Examiner* — Juan G Flores
(74) *Attorney, Agent, or Firm* — Cantor Colburn LLP

(57) ABSTRACT

A rotor assembly for a rotary wing aircraft includes a rotor hub having a central axis. The rotor hub is rotatable about the central axis. A plurality of flexible structural members extend radially outwardly from the rotor hub. Each flexible structural member is substantially U-shaped having a first arm extending from the hub, a second arm extending from the hub, and an end portion connecting the first arm to the second arm at a radially outboard end of the flexible structural member. The first arm, the second arm and/or the end portion have a cross section with a height along the central axis greater than a thickness of the cross section to increase stiffness of the rotor assembly along the central axis. The rotor assembly further includes a plurality of rotor blades,
(Continued)

each rotor blade being secured to each flexible structural member of the plurality of flexible structural members.

14 Claims, 4 Drawing Sheets

(51) Int. Cl.
    *B64C 27/33*          (2006.01)
    *B64C 27/46*          (2006.01)

(56) References Cited

U.S. PATENT DOCUMENTS

| | | |
|---|---|---|
| 3,754,840 A | 8/1973 | Zincone |
| 4,096,012 A | 6/1978 | Belko et al. |
| 4,251,309 A | 2/1981 | Class et al. |
| 4,427,340 A | 1/1984 | Metzger et al. |
| 4,792,280 A | 12/1988 | Olsen et al. |
| 4,874,292 A | 10/1989 | Matuska et al. |
| 5,364,230 A | 11/1994 | Krauss et al. |
| 7,695,249 B2 | 4/2010 | Krauss et al. |
| 9,499,262 B2 * | 11/2016 | Foskey .................. B64C 27/33 |
| 2008/0131280 A1 | 6/2008 | Krauss et al. |
| 2009/0010764 A1 | 1/2009 | Parisy et al. |
| 2010/0124501 A1 | 5/2010 | Muylaert et al. |
| 2013/0064674 A1 * | 3/2013 | Hunter .................. B64C 27/32 |
| | | 416/226 |

OTHER PUBLICATIONS

Extended European Search Report; European Application No. 15829478.5; dated Jan. 9, 2018; 7 Pages.

* cited by examiner

FLEX BEAM FOR ROTOR ASSEMBLY

CROSS REFERENCE TO RELATED APPLICATIONS

This application is a National Stage application of PCT/US2015/043785, filed Aug. 5, 2015, which claims the benefit of U.S. Provisional Application No.: 62/034,959, filed Aug. 8, 2014, both of which are incorporated by reference in their entirety herein.

BACKGROUND

The subject matter disclosed herein generally relates to rotor assemblies for aircraft use. More specifically, the subject disclosure relates to rotor flex beams for rigid rotor rotorcraft.

A rotary wing aircraft with a coaxial contra-rotating rotor system is capable of higher speeds as compared to conventional single rotor helicopters due in part to the balance of lift between advancing sides of the main rotor blades on the upper and lower rotor systems. To increase rotor speeds and reduce drag, it is desired to place the rotor assemblies of the coaxial rotor system closer to one another along the rotor axis to reduce drag on the system. In some aircraft this results in the use of a rigid rotor system, one without blade flap or blade lead/lag adjustment.

A flex-beam rotor offers a lightweight, cost effective construction for the rotor. In a flex-beam rotor, the assembly includes a rotor hub with a flex-beam arm extending from the rotor hub corresponding to each rotor blade of the rotor assembly. The rotor blade is then secured to the flex-beam arm and supported by one or more bearings. The typical flex-beam rotor, however, lacks a desired flat-wise stiffness (in a plane of rotation of the rotor assembly) to ensure the blades of the coaxial rotors do not collide, and also to provide a desired level of rotor vibratory response.

BRIEF SUMMARY

In one embodiment, a rotor assembly for a rotary wing aircraft includes a rotor hub having a central axis. The rotor hub is rotatable about the central axis. A plurality of flexible structural members extend radially outwardly from the rotor hub. Each flexible structural member is substantially U-shaped having a first arm extending from the hub, a second arm extending from the hub, and an end portion connecting the first arm to the second arm at a radially outboard end of the flexible structural member. The first arm, the second arm and/or the end portion have a cross-section with a height along the central axis greater than a thickness of the cross-section to increase stiffness of the rotor assembly along the central axis. The rotor assembly further includes a plurality of rotor blades, each rotor blade being secured to each flexible structural member of the plurality of flexible structural members.

Additionally or alternatively, in this or other embodiments, the rotor blade is secured to the flexible structural member at an inboard end via an inboard bearing located at the rotor hub.

Additionally or alternatively, in this or other embodiments, the rotor blade is secured to the flexible structural member via an outboard bearing located at the end portion of the flexible structural member.

Additionally or alternatively, in this or other embodiments, the outboard bearing connects to the rotor blade at substantially mid-span of the rotor blade.

Additionally or alternatively, in this or other embodiments, the end portion of the flexible structural member is twisted relative to the central axis.

Additionally or alternatively, in this or other embodiments, the first arm and/or the second arm have decreasing height with increasing distance from the rotor hub.

Additionally or alternatively, in this or other embodiments, a thickness of the first arm and/or the second arm decreases with increasing distance from the rotor hub.

In another embodiment, a flex beam for a rotor assembly of a rotary wing aircraft includes a flexible structural member extending radially outwardly from a rotor hub of the rotor assembly. The flexible structural member is substantially U-shaped and has a first arm, a second arm, and an end portion connecting the first arm to the second arm at a radially outboard end of the flexible structural member. The first arm, the second arm and/or the end portion have a cross-section with a height along the central axis greater than a thickness of the cross-section to increase stiffness of the rotor assembly along the central axis.

Additionally or alternatively, in this or other embodiments, the end portion of the flexible structural member is twisted relative to the central axis.

Additionally or alternatively, in this or other embodiments, the first arm and/or the second arm have decreasing height with increasing distance from the rotor hub.

Additionally or alternatively, in this or other embodiments, the height decreases nonlinearly.

Additionally or alternatively, in this or other embodiments, a thickness of the first arm and/or the second arm decreases with increasing distance from the rotor hub.

Additionally or alternatively, in this or other embodiments, the thickness decreases nonlinearly.

In another embodiment, a rotary winged aircraft includes an airframe, a drive system located at the airframe, and a rotor assembly located at the airframe and operably connected to the drive system. The rotor assembly includes a rotor hub having a central axis.

The rotor hub is rotatable about the central axis. A plurality of flexible structural members extend radially outwardly from the rotor hub. Each flexible structural member is substantially U-shaped having a first arm extending from the hub, a second arm extending from the hub, and an end portion connecting the first arm to the second arm at a radially outboard end of the flexible structural member. The first arm, the second arm and/or the end portion have a cross-section with a height along the central axis greater than a thickness of the cross-section to increase stiffness of the rotor assembly along the central axis. The rotor assembly further includes a plurality of rotor blades, each rotor blade being secured to each flexible structural member of the plurality of flexible structural members.

Additionally or alternatively, in this or other embodiments, the first arm and/or the second arm have decreasing height with increasing distance from the rotor hub.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
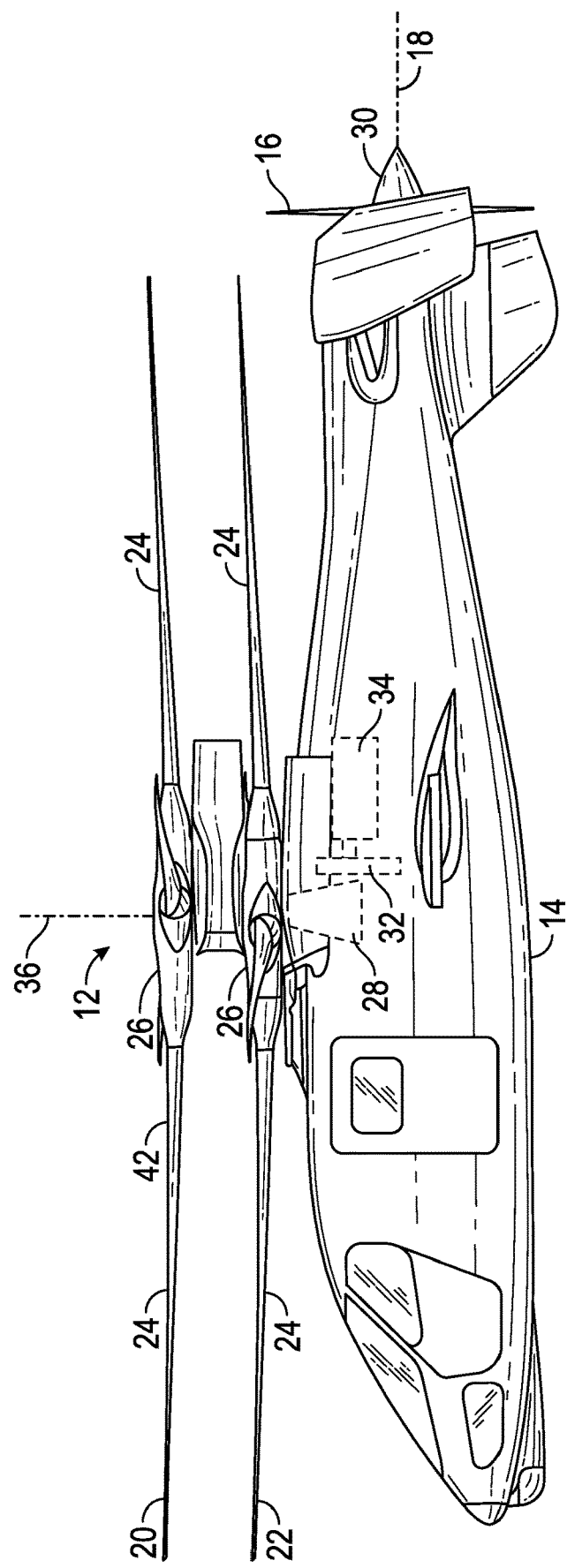
FIG. 1 is a general side view of an exemplary rotary wing aircraft for use in accordance with embodiments.

FIG. 1 illustrates an exemplary vertical takeoff and landing (VTOL) high speed compound or coaxial contra-rotating rigid rotor aircraft 10 having a dual, contra-rotating main rotor system 12, which rotates about a rotor axis 36. The aircraft 10 includes an airframe 14 which supports the dual, contra-rotating, coaxial main rotor system 12 as well as a translational thrust system 16 which provides translational thrust generally parallel to an aircraft longitudinal axis 18.

The main rotor system 12 includes an upper rotor system 20 and a lower rotor system 22 as dual contra-rotating main rotors in a coaxial configuration. A plurality of rotor blade assemblies 24 are mounted to a rotor hub assembly 26 of each rotor system 20, 22. The main rotor system 12 is driven by a transmission 28. The translational thrust system 16 may be any mechanism for providing forward thrust, such as a propeller system (including, but not limited to a pusher propeller, a tractor propeller, a nacelle mounted propeller, etc.), a jet engine or other like thrust systems. In the example of FIG. 1, the translational thrust system 16 includes an auxiliary propulsor 30. In an embodiment, the auxiliary propulsor 30 is a pusher propeller system with a propeller rotational axis oriented substantially horizontal and parallel to the aircraft longitudinal axis 18 to provide thrust for high speed flight. The translational thrust system 16 may be driven through a main gearbox 32 which also drives the main rotor system 12.

The transmission 28 includes the main gearbox 32 driven by one or more engines, illustrated schematically at 34. The main gearbox 32 and engines 34 are considered as part of the non-rotating frame of the aircraft 10. In the case of a rotary wing aircraft, the main gearbox 32 may be interposed between one or more gas turbine engines 34, the main rotor system 12 and the translational thrust system 16. In one embodiment, the main gearbox 32 is a split torque gearbox which carries torque from the engines 34 through a multitude of drivetrain paths. Although a particular rotary wing aircraft configuration is illustrated and described in the disclosed non-limiting embodiment, other configurations and/or machines with rotor systems are within the scope of the present invention. It is to be appreciated that while the description herein relates to a rotary wing aircraft with a dual coaxial contra-rotating rotor system, the disclosure herein may be as readily applied to other rotor systems, such as a conventional single rotor system.

Figure 2:
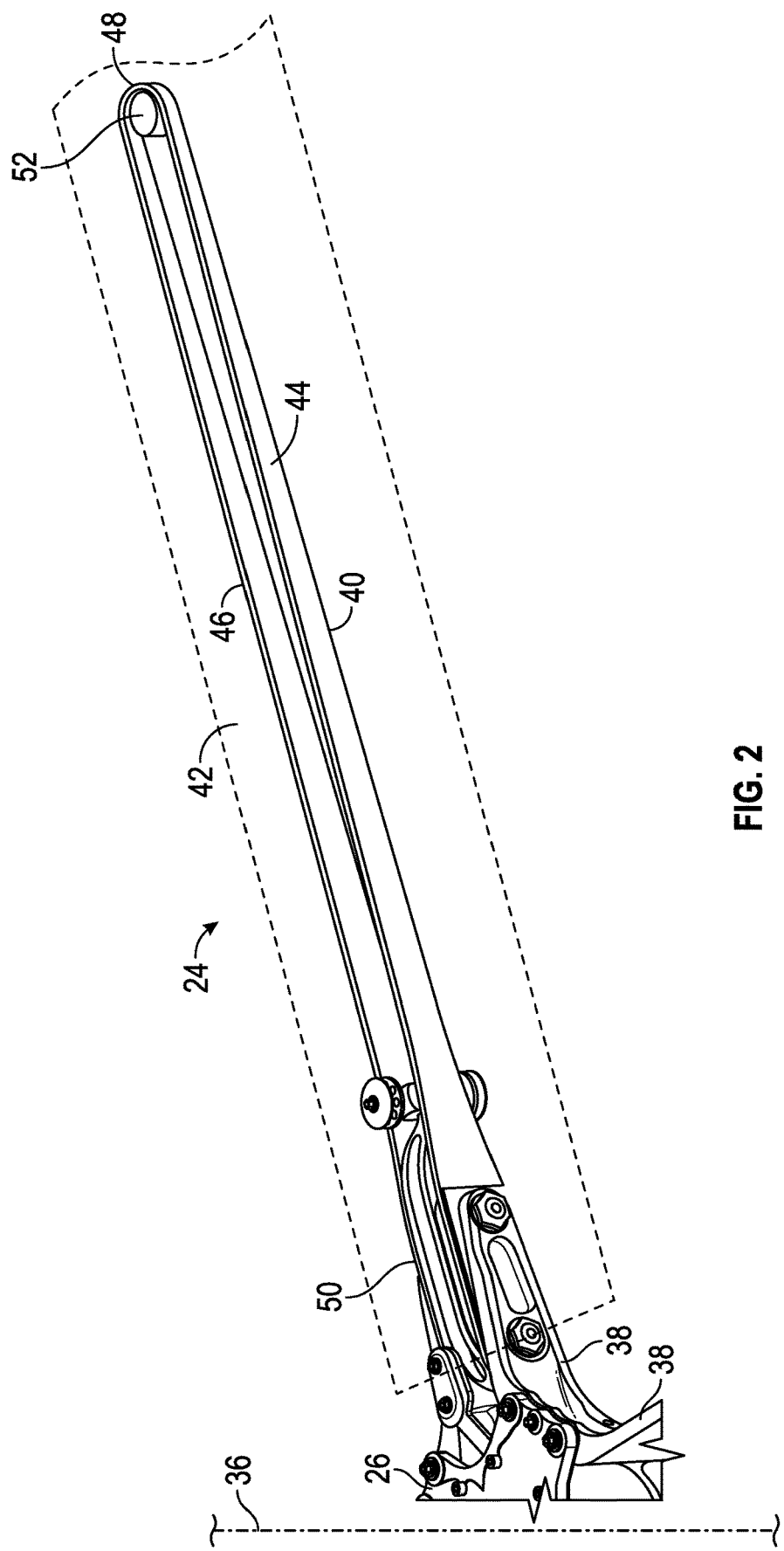
FIG. 2 is a perspective view of an embodiment of a rotor assembly.

Referring now to FIG. 2, the rotor hub assembly 26 is located at, and rotates about, rotor axis 36. The hub assembly 26 includes a plurality of hub arms 38 extending radially outwardly from the rotor axis 36, with a rotor blade assembly 24 secured at each hub arm 38. The rotor blade assembly 24 includes a flexible structural member, in particular a flex beam 40 secured to the hub arm 38 and a rotor blade 42 secured to and supported by the flex beam 40. In some embodiments, the rotor blade 42 has an airfoil-shaped cross-section. The flex beam 40 is substantially U-shaped having a first flex beam arm 44 and a second flex beam arm 46 connected at a beam end 48. The first flex beam arm 44 and the second flex beam arm 46 are secured to the hub arm 38. The rotor blade 42 is secured to the flex beam 40 at inboard bearing 50 located at the hub arm 38 and an outboard bearing 52 located at the beam end 48, which in some embodiments is at a substantially mid-span point of the rotor blade 42. While shown as made of a composite material, it is understood that the flex beam 40 can be made of a metal, wood, or other material capable of flexing in a controlled manner.

Figure 3:
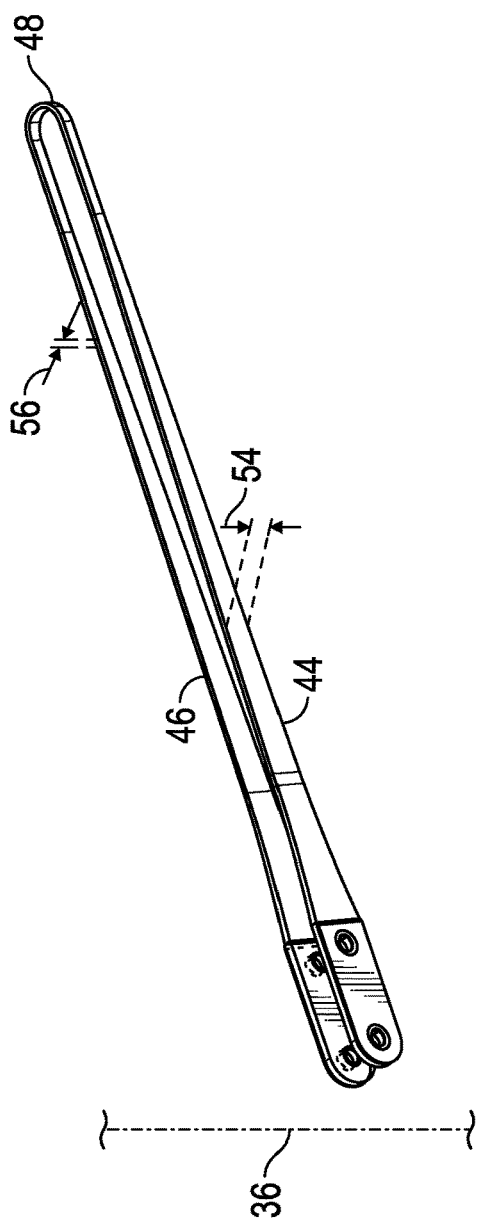
FIG. 3 is a perspective view of an exemplary flexible structural member for a rotor assembly.
Figure 4:
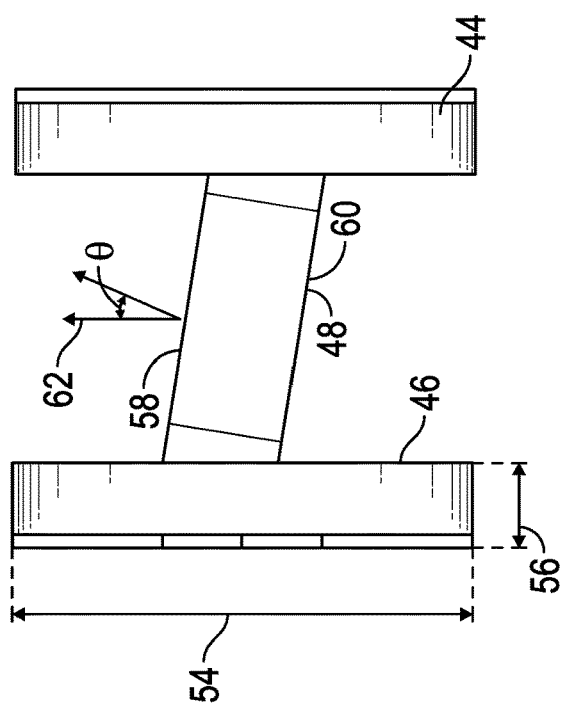
FIG. 4 is an end view of an exemplary flexible structural member for a rotor assembly.
Figure 6:
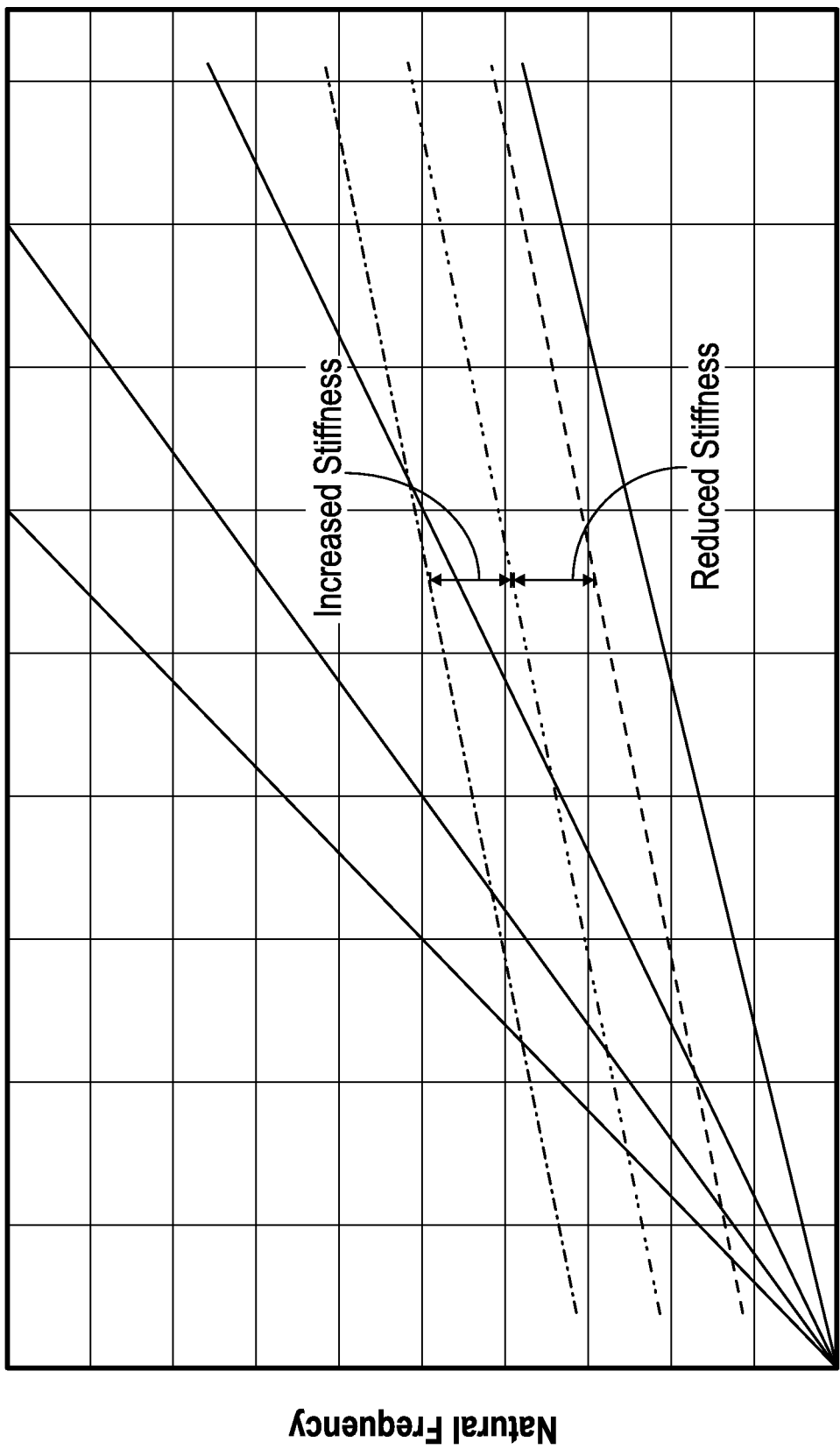
FIG. 6 is an exemplary graph illustrating effects of rotor blade stiffness on natural frequency.

Referring now to FIG. 3, each flex beam arm 44, 46 is oriented vertically (i.e., substantially parallel to the axis of rotation 36), having an aspect ratio of arm height 54 to arm thickness 56 greater than 1. This results in a flex beam arm 44, 46 (and thus a rotor blade assembly 24) that is stiff in the vertical direction (along the rotor axis 36) to reduce flapping of the rotor blade assembly 24 while allowing for lead/lag of the rotor blade assembly 24. Referring to FIG. 6, shown is a Southwell diagram illustrating that with tuning of stiffness of the rotor blade assembly 24 in the vertical direction via the disclosed flex beam 40, rotor natural frequencies can be changed to adjust vibratory response. Referring to FIG. 4, contributing to the stiffness of the flex beam 40 along the rotor axis 36 is a twist in the beam end 48. As shown, an upper face 58 and lower face 60 of the beam end 48 are oriented at a twist angle 62 relative to the rotor axis 36. The twist angle 62 is generally within the range of +/−10 degrees. The twist angle 62 provides for torsional motion of the rotor blade assembly 24 of about +/−30 degrees.

Figure 5:
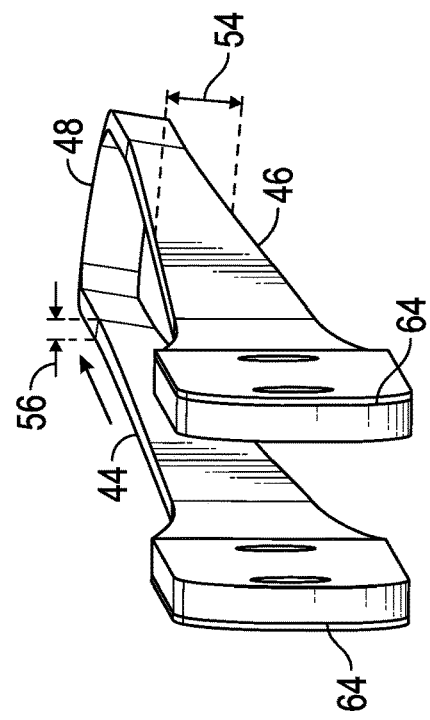
FIG. 5 is a perspective view of another exemplary flexible structural member for a rotor assembly.

Referring now to FIG. 5, each flex beam arm 44, 46 is tapered along its length from an arm base 64 to the beam end 48. The flex beam arm 44, 46 has its greatest arm height 54 and greatest arm thickness 56 at the arm base 64. Arm height 54 is reduced, in some embodiments nonlinearly, from the arm base 64 to the beam end 48. In some embodiments, the arm height 54 at the beam end 48 is about 25% of the arm height 54 at the arm base 64. Further, arm thickness 56 is reduced, in some embodiments nonlinearly, from the arm base 64 to the beam end 48. In some embodiments, the arm thickness 56 at the beam end 48 is about 50% of the arm thickness 56 at the arm base 64. The transition in arm height 54 and arm thickness 56 contributes to the improved stiffness along the rotor axis 36, while also accounting for natural frequencies and load share between the various elements of the rotor blade assembly 24 along the length of the blade 42. The flex beam 40 remains torsionally soft, allowing for pitch and twist of the flex beam 40 at the beam end 48, thus enabling pitch and twist of the rotor blade assembly 24 and improved twist bend buckling resistance while maintaining the out of plane stiffness.

While the invention has been described in detail in connection with only a limited number of embodiments, it should be readily understood that the invention is not limited to such disclosed embodiments. For instance, while described in terms of aircraft, it is understood that aspects could be used in other contexts such as for wind turbines, maritime propulsion, or other technologies in which a rotating element's plan of rotation will vary from perpendicular with the axis of rotation of a shaft driving the rotating element. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotor assembly for a rotary wing aircraft comprising:
a rotor hub having a central axis, the rotor hub rotatable about the central axis;
a plurality of flexible structural members extending radially outwardly from the rotor hub, each flexible structural member substantially U-shaped having:
a first arm extending from the hub;
a second arm extending from the hub; and
an end portion connecting the first arm to the second arm at a radially outboard end of the flexible structural member, the first arm, the second arm and/or the end portion having a cross-section with a height along the central axis greater than a thickness of the cross-section to increase stiffness of the rotor assembly along the central axis, wherein the thickness of the cross-section decreases non-linearly over a length of the flexible structural member; and
a plurality of rotor blades, each rotor blade being secured to each flexible structural member of the plurality of flexible structural members.

2. The rotor assembly of claim 1, wherein the rotor blade is secured to the flexible structural member at an inboard end via an inboard bearing disposed at the rotor hub.

3. The rotor assembly of claim 1, wherein the rotor blade is secured to the flexible structural member via an outboard bearing disposed at the end portion of the flexible structural member.

4. The rotor assembly of claim 3, wherein the outboard bearing connects to the rotor blade at substantially mid-span of the rotor blade.

5. The rotor assembly of any of claim 1, wherein the end portion of the flexible structural member is twisted relative to the central axis.

6. The rotor assembly of any of claim 1, wherein the first arm and/or the second arm have decreasing height with increasing distance from the rotor hub.

7. The rotor assembly of any of claim 1, wherein a thickness of the first arm and/or the second arm decreases with increasing distance from the rotor hub.

8. A flex beam for a rotor assembly of a rotary wing aircraft comprising:
a flexible structural member extending radially outwardly from a rotor hub of the rotor assembly, the flexible structural member substantially U-shaped having:
a first arm;
a second arm; and
an end portion connecting the first arm to the second arm at a radially outboard end of the flexible structural member, the first arm, the second arm and/or the end portion having a cross-section with a height along the central axis greater than a thickness of the cross-section to increase stiffness of the rotor assembly along the central axis, wherein the thickness of the cross-section decreases non-linearly over a length of the flexible structural member.

9. The flex beam of claim 8, wherein the end portion of the flexible structural member is twisted relative to the central axis.

10. The flex beam of claim 8, wherein the first arm and/or the second arm have decreasing height with increasing distance from the rotor hub.

11. The flex beam of claim 10, wherein the height decreases nonlinearly.

12. The flex beam of claim 8, wherein a thickness of the first arm and/or the second arm decreases with increasing distance from the rotor hub.

13. A rotary winged aircraft comprising:
an airframe;
a drive system disposed at the airframe; and
a rotor assembly disposed at the airframe and operably connected to the drive system, the rotor assembly including:
a rotor hub having a central axis, the rotor hub rotatable about the central axis;
a plurality of flexible structural members extending radially outwardly from the rotor hub, each flexible structural member substantially U-shaped having:
a first arm extending from the hub;
a second arm extending from the hub; and
an end portion connecting the first arm to the second arm at a radially outboard end of the flexible structural member, the first arm, the second arm and/or the end portion having a cross-section with a height along the central axis greater than a thickness of the cross-section to increase stiffness of the rotor assembly along the central axis, wherein the thickness of the cross-section decreases non-linearly over a length of the flexible structural member; and
a rotor blade secured to each flexible structural member of the plurality of flexible structural members.

14. The aircraft of claim 13, wherein the first arm and/or the second arm have decreasing height with increasing distance from the rotor hub.

* * * * *